(12) United States Patent
Nakagaki et al.

(10) Patent No.: US 11,820,191 B2
(45) Date of Patent: Nov. 21, 2023

(54) STABILIZER BUSH

(71) Applicant: Toyo Tire Corporation, Itami (JP)

(72) Inventors: Takahiro Nakagaki, Itami (JP); Yoshiyuki Saihara, Itami (JP)

(73) Assignee: Toyo Tire Corporation, Itami (JP)

( * ) Notice: Subject to any disclaimer, the term of this patent is extended or adjusted under 35 U.S.C. 154(b) by 239 days.

(21) Appl. No.: 17/295,531

(22) PCT Filed: May 29, 2020

(86) PCT No.: PCT/JP2020/021441
§ 371 (c)(1),
(2) Date: May 20, 2021

(87) PCT Pub. No.: WO2020/255679
PCT Pub. Date: Dec. 24, 2020

(65) Prior Publication Data
US 2022/0016952 A1 Jan. 20, 2022

(30) Foreign Application Priority Data

Jun. 20, 2019 (JP) .................................. 2019-114478

(51) Int. Cl.
*B60G 21/055* (2006.01)
*F16F 1/387* (2006.01)

(52) U.S. Cl.
CPC ........ *B60G 21/0551* (2013.01); *F16F 1/3873* (2013.01); *F16F 1/3876* (2013.01);
(Continued)

(58) Field of Classification Search
CPC .......... F16F 1/3837; F16F 1/38; F16F 1/3876; F16F 1/3842; F16F 1/3605; F16F 1/371;
(Continued)

(56) References Cited

U.S. PATENT DOCUMENTS

| 2010/0176544 A1* | 7/2010 | Miyamoto | F16F 1/377 |
| | | | 267/189 |
| 2011/0170814 A1* | 7/2011 | Nakamura | F16F 1/16 |
| | | | 384/125 |

(Continued)

FOREIGN PATENT DOCUMENTS

| JP | 60-8118 U | 1/1985 |
| JP | H08244431 A * | 9/1996 |

(Continued)

OTHER PUBLICATIONS

International Search Report dated Aug. 11, 2020, issued in counterpart International Application No. PCT/ JP2020/021441 (2 pages).

(Continued)

*Primary Examiner* — Robert A. Siconolfi
*Assistant Examiner* — San M Aung
(74) *Attorney, Agent, or Firm* — WHDA, LLP

(57) ABSTRACT

Provided is a stabilizer bush that ensures improved durability. The stabilizer bush (10) comprises: a bush main body (11) formed from a tubular elastic body having a retention hole (12) through which the stabilizer bar (2) passes; a rigid body portion (14) that is fixed to the bush main body (11) and has a higher rigidity than the bush main body (11); and an elastic film (16) that comprises an elastic body and is in contact with a second surface (14b) of the rigid body portion (14). A part of the elastic film (16) is fitted into depressed portions (15a, 15b) that are depressed from the second surface (14b) to a first surface (14a) side.

8 Claims, 4 Drawing Sheets

(52) U.S. Cl.
CPC ............... *B60G 2204/1222* (2013.01); *B60G 2204/41043* (2013.01); *F16F 2234/06* (2013.01)

(58) Field of Classification Search
CPC ........ F16F 1/376; F16F 1/377; F16F 2234/06; B60G 21/0551; B60G 21/055; B60G 2204/1222; B60G 2204/41043; B60G 2204/41
USPC ....... 267/189, 141.1, 293, 294; 280/124.107, 280/124.152
See application file for complete search history.

(56) References Cited

U.S. PATENT DOCUMENTS

| | | | | |
|---|---|---|---|---|
| 2015/0239319 | A1* | 8/2015 | Kuroda | B60G 21/0551 156/581 |
| 2016/0001627 | A1* | 1/2016 | Kobayashi | B60G 21/0551 248/596 |
| 2016/0303939 | A1* | 10/2016 | Tsukamoto | B60G 21/0551 |
| 2018/0245654 | A1* | 8/2018 | Akiyama | F16F 1/3842 |
| 2019/0263214 | A1* | 8/2019 | Matsumura | B60G 21/0551 |

FOREIGN PATENT DOCUMENTS

| | | |
|---|---|---|
| JP | 2009-18697 A | 1/2009 |
| JP | 2014-84061 A | 5/2014 |
| JP | 2015-143076 A | 8/2015 |

OTHER PUBLICATIONS

Notification of Transmittal of Translation of the International Preliminary Report on Patentability (Form PCT/IB/338) issued in counterpart International Application No. PCT/JP2020/021441 dated Dec. 23, 2021. (1 page).

International Preliminary Report on Patentability (Form PCT/IPEA/409) issued in counterpart International Application No. PCT/JP2020/021441 dated Nov. 6, 2020. (4 page).

Office Action dated Apr. 29, 2022, issued in counterpart CN Application No. 202080006190.1 with English Translation. (9 pages).

Office Action dated Feb. 7, 2023, issued in counterpart JP Application No. 2019-114478, with English Translation.

* cited by examiner

STABILIZER BUSH

TECHNICAL FIELD

The present invention relates to a stabilizer bush, in particular, relates to a stabilizer bush that ensures improved durability.

BACKGROUND ART

A tubular stabilizer bush having a retention hole through which a stabilizer bar passes is interposed between an installation surface of a vehicle body member and an inner surface of an arch-shaped fixture mounted on the vehicle body member. Patent Literature 1 discloses a stabilizer bush in which a rigid body portion with a rigidity higher than that of a bush main body is buried on an installation surface side of the bush main body made of a tubular elastic body so as to increase a spring constant in an axis-perpendicular direction even when a distance between the installation surface and the stabilizer bar is long.

Since an elastic film as a part of the bush main body is interposed between the rigid body portion and the installation surface, an abnormal noise caused by, for example, rubbing between the rigid body portion and the installation surface can be reduced. Furthermore, since the elastic film is thinner than the minimum thickness of the rigid body portion, a change in spring constant of the stabilizer bush depending on presence/absence of the elastic film between the rigid body portion and the installation surface can be reduced.

CITATION LIST

Patent Literature

Patent Literature 1: Japanese Unexamined Utility Model Application Publication No. 60-3113

SUMMARY OF INVENTION

Technical Problem

However, in the above-described conventional technique, while it also depends on, for example, a securing method of the bush main body to the elastic body, an interface between the bush main body and the rigid body portion is sometimes displaced when a force is applied to the stabilizer bush from the stabilizer bar, thereby possibly reducing durability of the stabilizer bush. In particular, since the thin elastic film has a small deformation amount in a direction parallel to the interface with the rigid body portion, the interface between the elastic film and the rigid body portion is easily displaced by the force in the parallel direction, thereby easily reducing the durability of the stabilizer bush.

The present invention is made in order to solve the above-described problems, and it is one of its objectives to provide a stabilizer bush that ensures improved durability.

Solution to Problem

To achieve the objective, a stabilizer bush of the present invention is one interposed between an installation surface of a vehicle body member and an inner surface of an arch-shaped fixture mounted on the vehicle body member. The stabilizer bush includes a bush main body, a rigid body portion, and an elastic film. The bush main body is formed of a tubular elastic body having a retention hole through which a stabilizer bar passes. The bush main body has a part of an outer peripheral surface in contact with the inner surface of the fixture. The rigid body portion is secured to a side of the installation surface of the bush main body. The rigid body portion has a rigidity higher than a rigidity of the bush main body. The elastic film is made of the elastic body interposed between the rigid body portion and the installation surface. The rigid body portion includes a first surface and a second surface. With the first surface, the bush main body is in contact. The second surface is arranged between the first surface and the installation surface. The second surface is in contact with the elastic film. A thickness from a surface in contact with the installation surface to a surface in contact with the second surface in the elastic film is thinner than a minimum dimension from the first surface to the second surface. On the rigid body portion, a depressed portion is formed to be depressed from the second surface to a side of the first surface such that a part of the elastic film fits in the depressed portion.

Advantageous Effects of Invention

According to the stabilizer bush according to aspect 1, the depressed portion is formed to be depressed from the second surface to the side of the first surface such that a part of the elastic film fits in the depressed portion in the rigid body portion. A part of the elastic film that fits in this depressed portion ensures reducing a displacement of an interface between the second surface and the elastic film, thereby ensuring improved durability of the stabilizer bush.

A stabilizer bush according to aspect 2 provides the following effect in addition to the effect provided by the stabilizer bush according to aspect 1. Since the bush main body is made of a self-lubrication rubber, a friction resistance between the stabilizer bar and the bush main body can be reduced. Although it is difficult to secure the rigid body portion to the self-lubrication rubber by adhesion, the bush main body and the elastic film integrally molded cover the rigid body portion, and therefore, the rigid body portion can be easily secured to the bush main body and the elastic film and a necessity for a process of securing the rigid body portion to the bush main body and the elastic film after molding can be eliminated.

A stabilizer bush according to aspect 3 provides the following effect in addition to the effect provided by the stabilizer bush according to aspect 1 or 2. The depressed portion opens to the first surface and is formed to pass through the rigid body portion. The bush main body and the elastic film are integrally molded through the depressed portion. Therefore, when an interface between the first surface and the bush main body attempts to be displaced and when the interface between the second surface and the elastic film attempts to be displaced, a tensile resistance by the bush main body and the elastic film in the depressed portion ensures reducing the displacements. As a result, durability of the stabilizer bush can be further improved.

A stabilizer bush according to aspect 4 provides the following effect in addition to the effect provided by the stabilizer bush according to any one of aspects 1 to 3. A projecting portion that is inserted into a mounting hole formed on the installation surface projects from the elastic film to an opposite side of the rigid body portion. This projecting portion can cause the stabilizer bush to be difficult to move in a central axis direction of the retention hole with respect to a vehicle body member and cause the stabilizer bush to be difficult to rotate about the stabilizer bar. The depressed portion includes first depressed portions provided on both sides in a central axis direction of the retention hole with respect to the projecting portion. Therefore, it is possible to cause the elastic film that fits in the first depressed portions to easily receive a force received by the projecting portion when the move of the stabilizer bush to the central axis direction of the retention hole is restricted. This ensures causing the interface between the second surface and the elastic film to be difficult to be displaced even when the projecting portion receives the force in the central axis direction of the retention hole, thereby ensuring further improved durability of the stabilizer bush.

A stabilizer bush according to aspect 5 provides the following effect in addition to the effect provided by the stabilizer bush according to any one of aspects 1 to 4. A projecting portion that is inserted into a mourning hole formed on the installation surface projects from the elastic film to an opposite side of the rigid body portion. This projecting portion can cause the stabilizer bush to be difficult to move in the central axis direction of the retention hole with respect to the vehicle body member and cause the stabilizer bush to be difficult to rotate about the stabilizer bar. The depressed portion includes second depressed portions provided on both sides in a circumferential direction of the retention hole with respect to the projecting portion. Therefore, it is possible to cause the elastic an that fits in the second depressed portions to easily receive a force received by the projecting portion when the rotation of the stabilizer bush about the stabilizer bar is restricted. This ensures causing the interface between the second surface and the elastic film to be difficult to be displaced even when the projecting portion receives the force in the circumferential direction of the retention hole, thereby ensuring further improved durability of the stabilizer bush.

A stabilizer bush according to aspect 6 provides the following effect in addition to the effect provided by the stabilizer bush according to any one of aspects 1 to 5. The first surface is formed into a planar shape perpendicular to a virtual plane including a central axis of the retention hole. This ensures causing the interface between the first surface and the bush main body to be difficult to be displaces in the circumferential direction of the retention hole, thereby ensuring further improved durability of the stabilizer bush.

DESCRIPTION OF EMBODIMENTS

Figure 1:
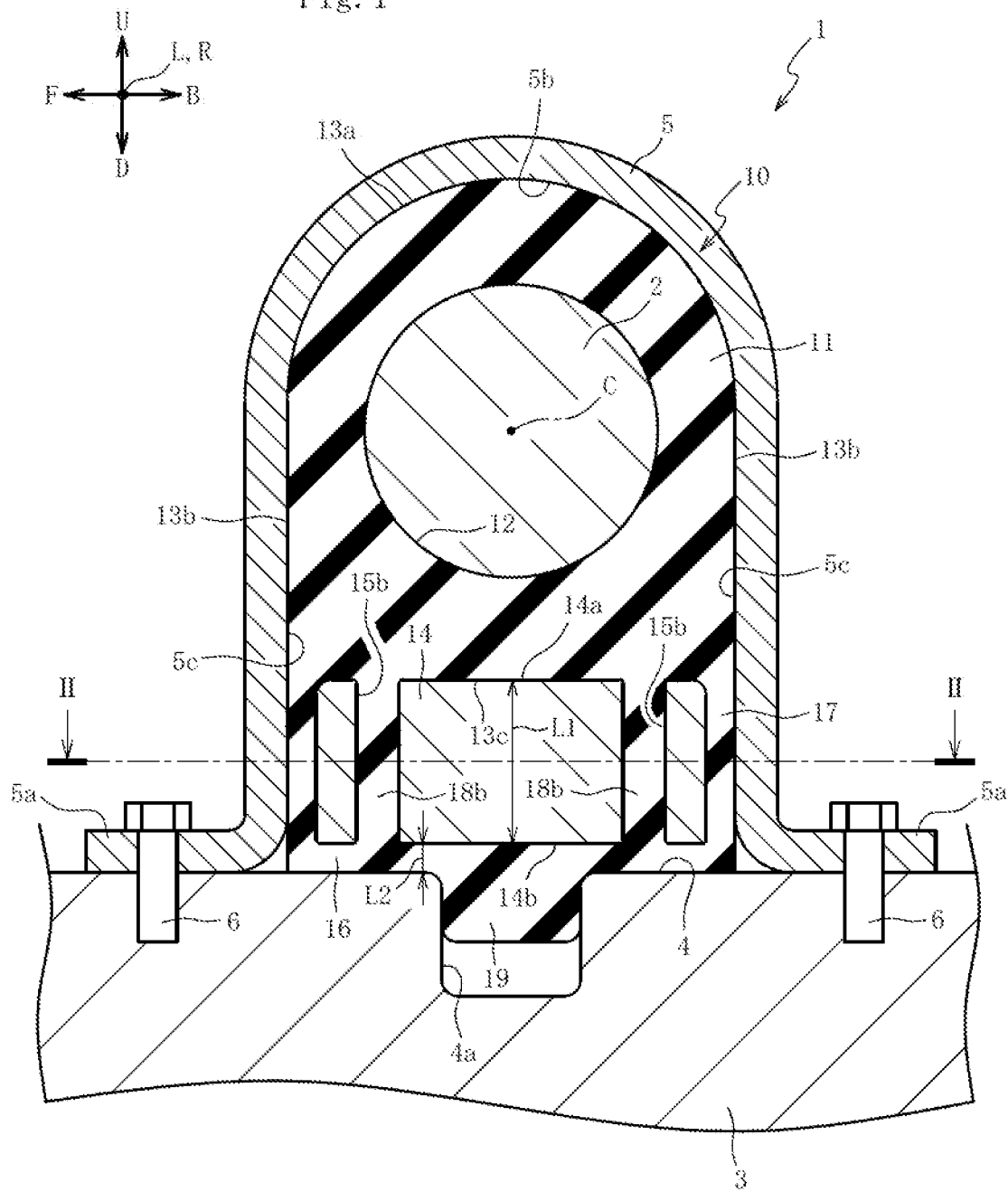
FIG. 1 is a cross-sectional view of a vibration isolator including a stabilizer bush according to a first embodiment.
Figure 2:
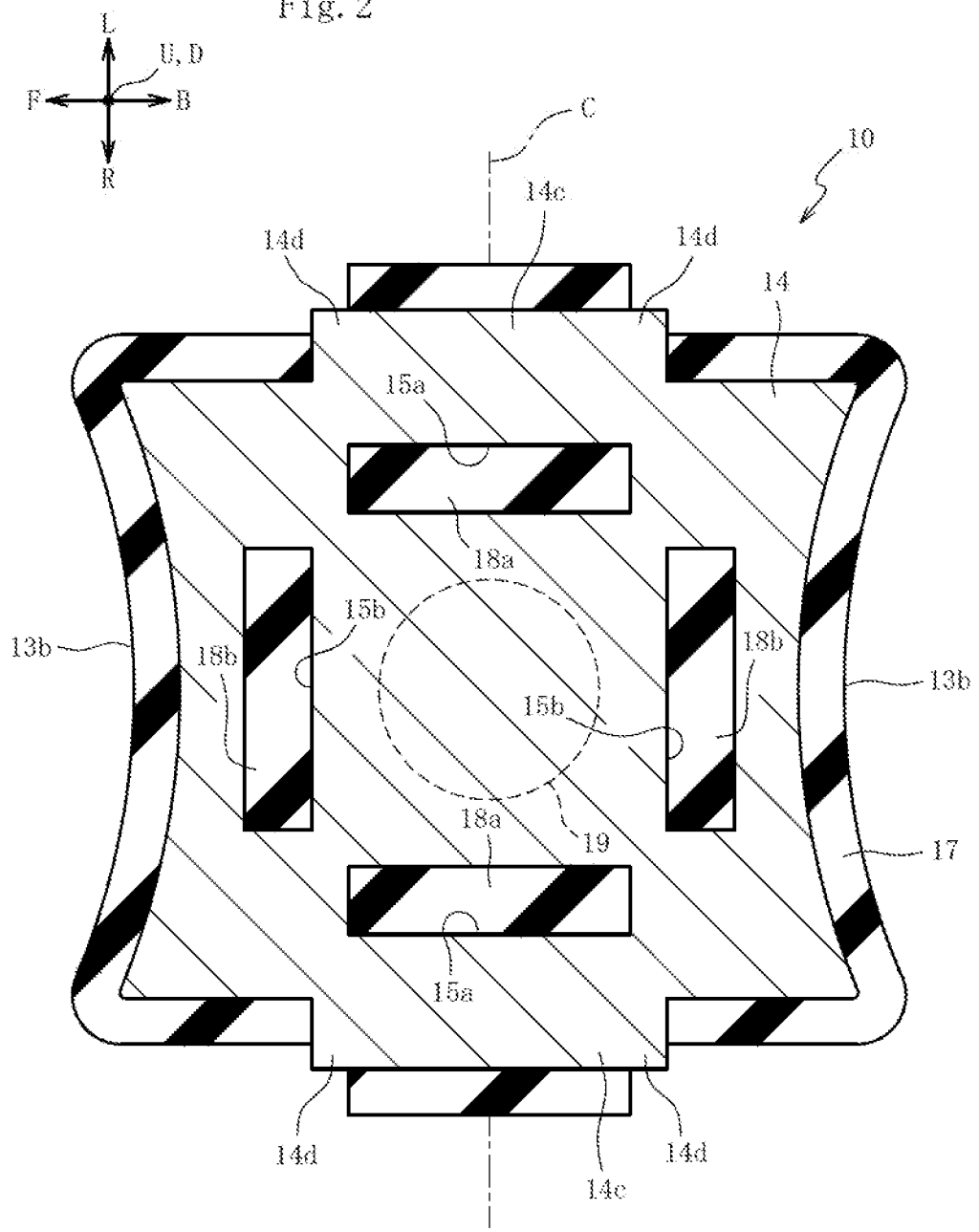
FIG. 2 is a cross-sectional view of the stabilizer bush taken along the line II-II in FIG. 1.
Figure 3:
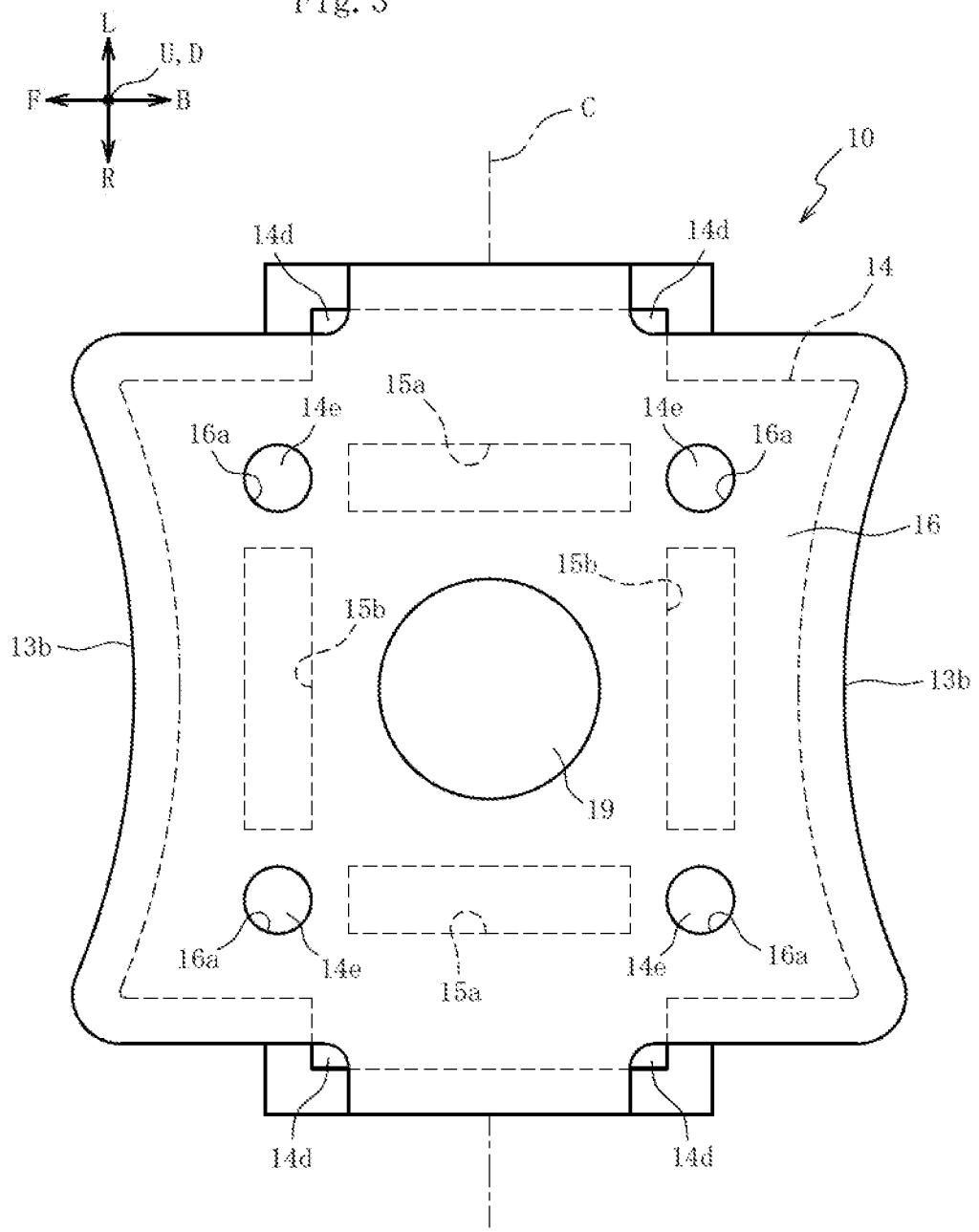
FIG. 3 is a bottom view of the stabilizer bush.

The following describes preferred embodiments with reference to the attached drawings. With reference to FIG. 1 to FIG. 3, a vibration isolator 1 including a stabilizer bush 10 according to a first embodiment will be described. FIG. 1 illustrates a cross-sectional view of the vibration isolator 1 perpendicular to a central axis of a stabilizer bar 2. The arrow U, the arrow D, the arrow L, the arrow R, the arrow F, and the arrow B in each drawing indicate an upward direction, a downward direction, a leftward direction, a rightward direction, a forward direction, and a rearward direction of the vibration isolator 1, respectively. Note that a right-left direction of this vibration isolator 1 corresponds to a right-left direction of a vehicle on which the vibration isolator 1 is mounted. On the other hand, an up-down direction and a front-rear direction of the vibration isolator 1 do not necessarily correspond to an up-down direction and a front-rear direction of the vehicle. For example, the up-down direction of the vibration isolator 1 may correspond to the front-rear direction of the vehicle.

As illustrated in FIG. 1, the vibration isolator 1 is for elastically supporting the stabilizer bar 2 on a vehicle body side (not illustrated). The vibration isolator 1 includes a vehicle body member 3 secured to the vehicle body side, an arch-shaped fixture 5 that is mounted on the vehicle body member 3 and surrounds an outer periphery of the stabilizer bar 2, and the stabilizer bush 10 that holds the stabilizer bar 2. The stabilizer bar 2 is a steel material in a shaft shape with the cross-sectional shape in an approximately precise circle and is arranged in the right-left direction of the vehicle.

The vehicle body member 3 is a metallic member and includes a planar-shaped installation surface 4 perpendicular to a virtual plane including a central axis C of the stabilizer bar 2. On the installation surface 4, a mounting hole 4a depressed downward is formed.

The fixture 5 is a metallic plate material bent into a semicircular arch shape so as to rise upward from the installation surface 4 when viewed in a central axis C direction and has a flange 5a, which projects out from a lower end, secured to the vehicle body member 3 with bolts 6. In the cross-section perpendicular to the central axis C, the fixture 5 has an inner surface that includes a circular inner surface 5b formed into an arc shape about the central axis C and linear inner surfaces 5c formed into an approximately perpendicular straight line on the installation surface 4. The circular inner surface 5b is opposed to the installation surface 4 in the up-down direction. The linear inner surfaces 5c continue into each of both ends in the circumferential direction of the circular inner surface 5b and face to one another in a parallel manner on the cross-section perpendicular to the central axis C.

The stabilizer bush 10 is interposed among the installation surface 4, the circular inner surface 5b, and the linear inner surfaces 5c and is subject to a compression deformation in the up-down direction. The stabilizer bush 10 includes a bush main body 11 formed of an elastic body that holds the stabilizer bar 2, a rigid body portion 14 secured to a side of the installation surface 4 of the bush main body 11, an elastic film 16 made of an elastic body interposed between the rigid body portion 14 and the installation surface 4, and a projecting portion 19 projecting downward from the elastic film 16.

The bush main body 11 is made of a self-lubrication rubber and is formed into a tubular shape with a retention hole 12 through which the stabilizer bar 2 passes. Examples of this self-lubrication rubber include one that bleeds a lubricant of, for example, fatty acid amide on a surface of the rubber to reduce a friction coefficient on the surface, thus providing lubricity. The retention hole 12 has an inner diameter approximately the same as an outer diameter of the stabilizer bar 2. Inserting an end portion of the stabilizer bar 2 into the retention hole 12 and sliding the bush main body 11 to a predetermined position of the stabilizer bar 2 ensures installing the bush main body 11 on the stabilizer bar 2. In a state where the stabilizer bar 2 is fitted in the retention hole 12, the retention hole 12 has a central axis corresponding to the central axis C of the stabilizer bar 2.

Since the bush main body 11 made of the self-lubrication rubber bleeds the lubricant on the inner peripheral surface of the retention hole 12, a friction resistance between the stabilizer bar 2 and the bush main body 11 can be reduced. As a result, an abnormal noise caused by rubbing between an outer peripheral surface of the stabilizer bar 2 and the inner peripheral surface of the retention hole 12 can be reduced, and the inner peripheral surface of the retention hole 12 can be caused to be difficult to be scraped.

An outer peripheral surface of the bush main body 11 includes a circular outer surface 13a in contact with the circular inner surface 5b, linear outer surfaces 13b in contact with the linear inner surfaces 5c, and a securing surface 13c in contact with and secured to the rigid body portion 14. The securing surface 13c is formed into a planar shape parallel to the installation surface 4. The circular outer surface 13a has a shape approximately the same as a shape of the circular inner surface 5b, and the linear outer surfaces 13b have a shape approximately the same as a shape of the linear inner surfaces 5c.

The linear outer surface 13b is formed up to an outer surface in the front-rear direction of an outer joining portion 17 described later and the elastic film 16. As illustrated in FIG. 2, the linear outer surface 13b has a central portion depressed inwardly with respect to both end portions in the central axis C direction. The circular outer surface 13a similarly has a central portion depressed inwardly with respect to both the end portions in the central axis C direction. Central portions of these linear outer surfaces 13b and circular outer surface 13a being in contact with the fixture 5 restricts the stabilizer bush 10 from moving in the central axis C direction with respect to the fixture 5.

As illustrated in FIG. 1 and FIG. 2, the rigid body portion 14 is a portion in an approximately rectangular parallelepiped shape with a rigidity higher than that of the bush main body 11. A material of the rigid body portion 14 is preferred to be metal or synthetic resin that hardly deforms by a force from the stabilizer bar 2 when it is mounted on the vehicle. Making a specific gravity of the material of the rigid body portion 14 smaller than a specific gravity of a material of the bush main body 11 ensures a weight reduction of the stabilizer bush 10.

The rigid body portion 14 includes a first surface 14a on which the securing surface 13c of the bush main body 11 is in contact and secured and a second surface 14b on an opposite side of the first surface 14a. On side surfaces in the right-left direction among the side surfaces of the rigid body portion 14 intersecting with the first surface 14a and the second surface 14b, projections 14c projecting in the right-left direction are disposed.

The first surface 14a and the second surface 14b are formed into planar shapes parallel to the installation surface 4, and a thickness (a minimum dimension) L1 of the rigid body portion 14 from the first surface 14a to the second surface 14b is approximately constant. Since the first surface 14a is formed into the planar shape perpendicular to a virtual plane including the central axis C, even when a force in the circumferential direction is applied to an interface between the first surface 14a and the bush main body 11 due to the stabilizer bush 10 attempting to rotate about the stabilizer bar 2, the interface can be caused to be difficult to be displaced in the circumferential direction of the retention hole 12.

The second surface 14b is arranged between the first surface 14a and the installation surface 4. On the rigid body portion 14, first depressed portions 15a and second depressed portions 15b depressed from the second surface 14b to a side of the first surface 14a are formed. These first depressed portions 15a and the second depressed portions 15b open on the first surface 14a and are formed to pass through the rigid body portion 14. The first depressed portions 15a are separated in the central axis C direction (the right-left direction) and formed at two positions. The second depressed portions 15b are separated in a circumferential direction (the front-rear direction) of the retention hole 12 and formed at two positions.

The first depressed portion 15a has a dimension in the circumferential direction of the retention hole 12 larger than a dimension in the central axis C direction. The second depressed portion 15b has a dimension in the central axis C direction larger than a dimension in the circumferential direction of the retention hole 12. Viewing the rigid body portion 14 in the thickness direction (in the up-down direction view), two first depressed portions 15a and two second depressed portions 15b are positioned at each side of a square.

The elastic film 16 is in contact with and secured to the second surface 14b, and is a portion in contact with the installation surface 4. A thickness L2 from a surface in contact with the installation surface 4 to a surface in contact with the second surface 14b in this elastic film 16 is smaller than the thickness L1 of the rigid body portion 14. The elastic film 16 is integrally molded with the bush main body 11 using the self-lubrication rubber. The outer joining portion 17 as a part of the bush main body 11 and the elastic film 16 covers side surfaces in the right-left direction and the front-rear direction of the rigid body portion 14. A first joining portion 18a as a part of the bush main body 11 and the elastic film 16 fits in the first depressed portion 15a and a second joining portion 18b as a part of the bush main body 11 and the elastic film 16 fits in the second depressed portion 15b.

Thus, covering the rigid body portion 14 with the bush main body 11 and the elastic film 16 secures the rigid body portion 14 to the bush main body 11 and the elastic film 16. In particular, while it is difficult to secure the rigid body portion 14 to the self-lubrication rubber forming the bush main body 11 and the elastic film 16 by adhesion, covering the rigid body portion 14 with the bush main body 11 and the elastic film 16 integrally molded ensures easily securing the rigid body portion 14 to the bush main body 11 and the elastic film 16. Furthermore, the necessity of a process of securing the rigid body portion 14 to the bush main body 11 and the elastic film 16 after molding can be eliminated.

As illustrated in FIG. 2 and FIG. 3, from portions positioned in the right-left direction (the central axis C direction) of the rigid body portion 14 in the outer joining portion 17, exposed portions 14d as corners of the projections 14c of the rigid body portion 14 are exposed. On the elastic film 16, four exposure holes 16a passing through in the thickness direction are formed. From this exposure hole 16a, an exposed portion 14e as a part of the second surface 14b of the rigid body portion 14 is exposed. Note that, in the up-down direction view, the exposure holes 16a and the exposed portions 14e are positioned on extended lines in longitudinal directions of the first depressed portions 15a and the second depressed portions 15b. With the rigid body portion 14 positioned in a metallic mold by bringing these exposed portions 14d and 14e in contact with the metallic mold (not illustrated), a raw material of the self-lubrication rubber is filled into the metallic mold to integrally mold the bush main body 11 and the elastic film 16, and thus, the stabilizer bush 10 is formed.

As illustrated in FIG. 1 and FIG. 3, the projecting portion 19 is a portion that projects to an opposite side of the rigid body portion 14 from the elastic film 16, and is integrally molded with the elastic film 16. The projecting portion 19 is positioned in the center in the right-left direction and the front-rear direction of the elastic film 16 and the rigid body portion 14. The respective first depressed portions 15a are provided on both sides in the central axis C direction with respect to the projecting portion 19 and the respective second depressed portions 15b are provided on both sides in the circumferential direction of the retention hole 12 with respect to the projecting portion 19.

The projecting portion 19 is inserted into the mounting hole 4a formed on the installation surface 4. This ensures restricting the stabilizer bush 10 from moving in the central axis C direction with respect to the vehicle body member 3 and ensures restricting the stabilizer bush 10 from rotating about the stabilizer bar 2. Furthermore, since the projecting portion 19 fits in the mounting hole 4a almost without a gap, it is possible to cause the stabilizer bush 10 to be further difficult to move in the central axis C direction and to cause the stabilizer bush 10 to be further difficult to rotate about the stabilizer bar 2.

According to the stabilizer bush 10 described above, the rigid body portion 14 having a rigidity higher than that of the bush main body 11 is disposed between the bush main body 11 made of the elastic body through which the stabilizer bar 2 passes and the installation surface 4 of the vehicle body member 3. This ensures increasing the spring constant in an opposing direction (the up-down direction) of the installation surface 4 and the circular inner surface 5b among axis-perpendicular directions of the stabilizer bush 10, and ensures decreasing a compression permanent distortion of the bush main body 11 in the opposing direction compared with a case where the stabilizer bush 10 is formed only by the bush main body 11. Accordingly, even though a distance between the installation surface 4 and the stabilizer bar 2 is long, the spring constant and the durability of the stabilizer bush 10 can be ensured by adjusting the thickness L1 of the rigid body portion 14.

When the rigid body portion 14 and the installation surface 4 are directly in contact, an abnormal noise is caused by, for example, rubbing between the rigid body portion 14 and the installation surface 4 or a collision of the rigid body portion 14 and the installation surface 4 after they are separated. In contrast to this, in this embodiment, since the elastic film 16 is interposed between the rigid body portion 14 and the installation surface 4, the abnormal noise caused by, for example, rubbing between the rigid body portion 14 and the installation surface 4 can be reduced. Furthermore, since the outer joining portion 17 is interposed between the rigid body portion 14 and the linear inner surfaces 5c of the fixture 5, the abnormal noise caused by, for example, rubbing between the rigid body portion 14 and the linear inner surfaces 5c can be reduced. Since the thickness L2 of the elastic film 16 is thinner than the thickness L1 of the rigid body portion 14, a change in spring constant of the stabilizer bush 10 depending on presence/absence of the elastic film 16 between the rigid body portion 14 and the installation surface 4 can be reduced.

Here, when a force is applied from the stabilizer bar 2 to the stabilizer bush 10, an interface between the securing surface 13c of the bush main body 11 and the first surface 14a of the rigid body portion 14 and an interface between the elastic film 16 and the second surface 14b of the rigid body portion 14 are possibly displaced. In particular, since the thin elastic film 16 has a small deformation amount in a direction parallel to the interface with the rigid body portion 14, this force in the parallel direction easily displaces the interface between the elastic film 16 and the rigid body portion 14.

However, in this embodiment, the first joining portions 18a and the second joining portions 18b as parts of the elastic film 16 fit in the first depressed portions 15a and the second depressed portions 15b formed on the second surface 14b of the rigid body portion 14. This ensures reducing the displacement of the interface between the second surface 14b and the elastic film 16. Since scraping, distortion, and the like of the elastic film 16 caused by this displacement can be reduced, the durability of the stabilizer bush 10 can be improved.

The first depressed portions 15a and the second depressed portions 15b also open on the first surface 14a. Since the first joining portions 18a and the second joining portions 18b as parts of the bush main body 11 fit in the first depressed portions 15a and the second depressed portions 15b, the displacement of the interface between the first surface 14a and the bush main body 11 can be reduced. As a result, the durability of the stabilizer bush 10 can be improved.

Furthermore, the first depressed portions 15a and the second depressed portions 15b are formed to pass through the rigid body portion 14 and the bush main body 11 and the elastic film 16 are integrally molded through the first depressed portion 15a and the second depressed portion 15b. Therefore, when the interface between the first surface 14a and the bush main body 11 attempts to be displaced or the interface between the second surface 14b and the elastic film 16 attempts to be displaced, these displacements can be reduced by a tensile resistance of the first joining portions 18a and the second joining portions 18b. As a result, the durability of the stabilizer bush 10 can be improved.

The first depressed portions 15a and the first joining portions 18a are provided both respective sides in the central axis C direction with respect to the projecting portion 19. This can cause the force received by the projecting portion 19 when the move of the stabilizer bush 10 in the central axis C direction is restricted to be easily received by the first joining portions 18a. This can cause the interface between the second surface 14b and the elastic film 16 and the interface between the first surface 14a and the bush main body 11 to be difficult to be displaced even when the force in the central axis C direction is received by the projecting portion 19, thereby ensuring further improved durability of the stabilizer bush 10.

In particular, since the longitudinal directions of the first depressed portions 15a and the first joining portions 18a are perpendicular to the central axis C direction, it is possible to easily distribute the force in the central axis C direction received by the projecting portion 19 across the longitudinal directions between the inner surfaces of the first depressed portions 15a and the first joining portions 18a. As a result, a shear stress applied to the first joining portions 18a can be distributed, thereby ensuring improved durability of the first joining portion 18a.

The second depressed portions 15b and the second joining portions 18b are provided on both respective sides in the circumferential direction (the front-rear direction) of the retention hole 12 with respect to the projecting portion 19. This can cause the force received by the projecting portion 19 when the rotation of the stabilizer bush 10 about the stabilizer bar 2 is restricted to be easily received by the second joining portions 18b. This can cause the interface between the second surface 14b and the elastic film 16 and the interface between the first surface 14a and the bush main body 11 to be difficult to be displaced even when the force in the circumferential direction of the retention hole 12 is received by the projecting portion 19, thereby ensuring further improved durability of the stabilizer bush 10.

In particular, since the longitudinal directions of the second depressed portions 15b and the second joining portions 18b are formed to be parallel to the central axis C direction, the force in the circumferential direction received by the projecting portion 19 can be easily distributed in the longitudinal directions between the inner surfaces of the second depressed portions 15b and the second joining portions 18b. As a result, a shear stress applied to the second joining portions 18b can be distributed, thereby ensuring improved durability of the second joining portion 18b.

Note that, when the interface between the second surface 14b and the elastic film 16 attempts to be displaced in the central axis C direction, the elastic film 16 on the extended lines in the longitudinal directions of the first depressed portions 15a hardly deform in the central axis C direction in the up-down direction view. Similarly, when the interface between the second surface 14b and the elastic film 16 attempts to be displaced in the circumferential direction of the retention hole 12, the elastic film 16 on the extended lines in the longitudinal directions of the second depressed portions 15b hardly deform in the circumferential direction in the up-down direction view. In the up-down direction view, the exposure holes 16a that pass through the elastic film 16 in the thickness direction are located on the extended lines in the longitudinal directions of these first depressed portions 15a and second depressed portions 15b. Since it is possible to cause the proximities of the exposure holes 16a to be difficult to tensile-deform when the elastic film 16 tensile-deforms in the central axis C direction and in the circumferential direction, tears of the elastic film 16 starting from the exposure holes 16a can be reduced. As a result, the durability of the elastic film 16 can be ensured.

Next, a second embodiment will be described with reference to FIG. 4. In the first embodiment, the case where the bush main body 11 and the elastic film 16 are integrally molded has been described. In contrast to this, the second embodiment describes a case where a bush main body 22 and an elastic film 26 are different members. Note that portions the same as those in the first embodiment are attached with the same reference numerals to omit the following description.

Figure 4:
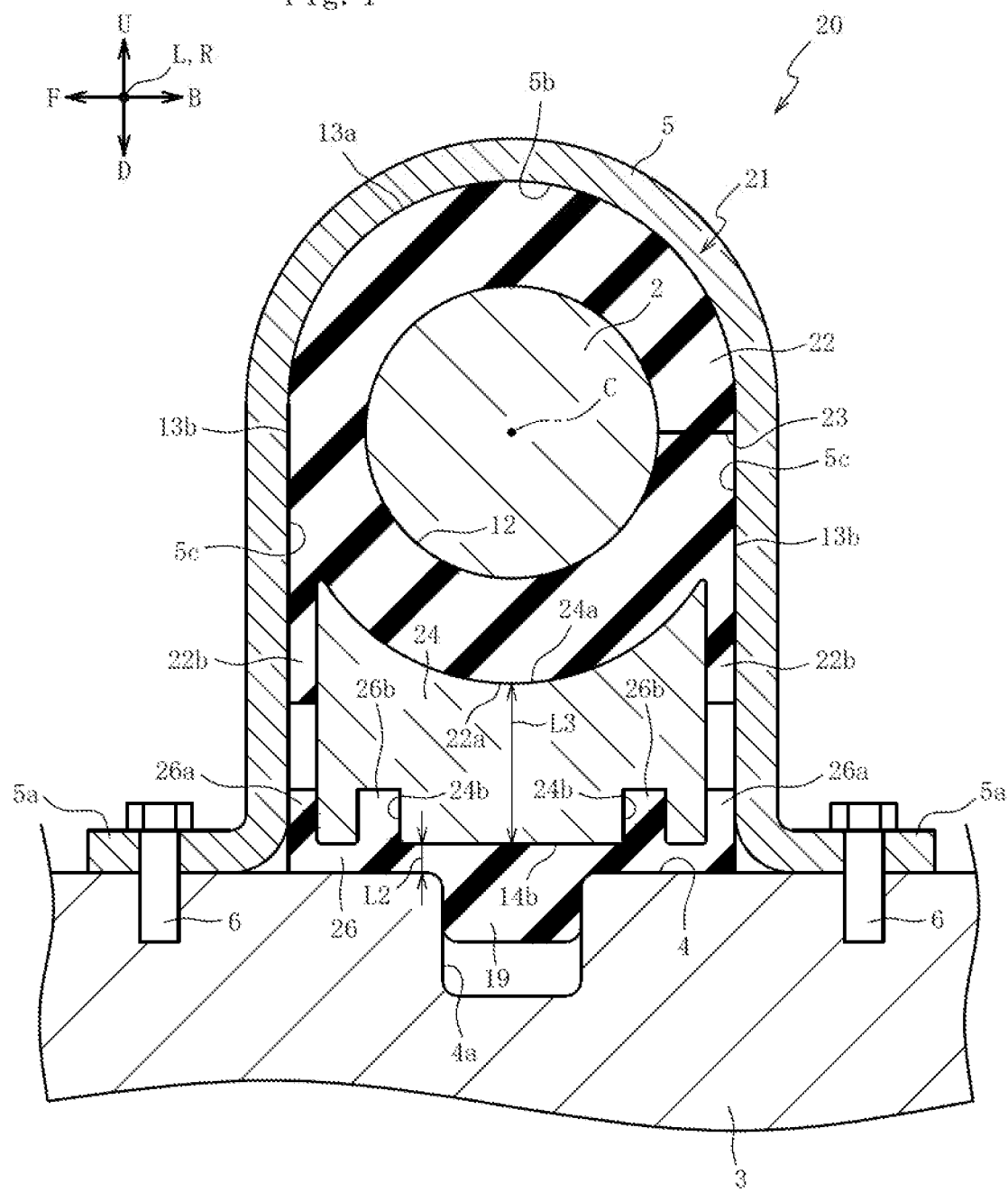
FIG. 4 is a cross-sectional view of a vibration isolator including a stabilizer bush according to a second embodiment.

As illustrated in FIG. 4, a stabilizer bush 21 of a vibration isolator 20 is subject to a compression deformation in the up-down direction interposed between the vehicle body member 3 and the fixture 5. The stabilizer bush 21 includes the bush main body 22 formed of an elastic body that holds the stabilizer bar 2, a rigid body portion 24 secured to a side of the installation surface 4 of the bush main body 22, the elastic film 26 made of an elastic body interposed between the rigid body portion 24 and the installation surface 4, and the projecting portion 19 that projects downward from the elastic film 26.

The bush main body 22 is made of the elastic body other than a self-lubrication rubber, and is formed into a tubular shape having the retention hole 12 through which the stabilizer bar 2 passes. Note that, examples of the elastic body other than the self-lubrication rubber include, for example, a rubber other than the self-lubrication rubber and a thermoplastic elastomer. The bush main body 22 is provided with a cut portion 23 that divides the bush main body 22 in the circumferential direction. The stabilizer bar 2 is guided into the retention hole 12 while expanding this cut portion 23, and the outer peripheral surface of the stabilizer bar 2 and the inner peripheral surface of the retention hole 12 are adhered, and thus, the bush main body 22 is mounted on the stabilizer bar 2.

The bush main body 22 has an outer peripheral surface including the circular outer surface 13a in contact with the circular inner surface 5b, the linear outer surfaces 13b in contact with the linear inner surfaces 5c, and a securing surface 22a on which the rigid body portion 24 is in contact and secured. The securing surface 22a is formed into an arc shape about the central axis C on the cross-section perpendicular to the central axis C.

The bush main body 22 is provided with outer elastic films 22b extending downward from both ends in the circumferential direction of the securing surface 22a. These outer elastic films 22b are interposed in the front-rear direction between the rigid body portion 24 and the fixture 5. The linear outer surface 13b is provided up to a lower end of the outer elastic film 22b.

The rigid body portion 24 is a portion in an approximately rectangular parallelepiped shape with a rigidity higher than that of the bush main body 22. The rigid body portion 24 includes a first surface 24a on which the securing surface 22a of the bush main body 22 is in contact and is secured and the second surface 14b on the opposite side of the first surface 24a.

The first surface 24a is, similarly to the securing surface 22a, formed into an arc shape about the central axis C on a cross-section perpendicular to the central axis C and is depressed toward the second surface 14b side. Since the second surface 14b has a planar shape, a thickness of the rigid body portion 24 on a perpendicular line from the central axis C to the second surface 14b is a minimum dimension L3 of the rigid body portion 24 from the first surface 24a to the second surface 14b. Adhering the securing surface 22a of the bush main body 22 and the outer elastic films 22b on side surfaces of the rigid body portion 24 and the first surface 24a secures the rigid body portion 24 to the bush main body 22.

On the rigid body portion 24, second depressed portions 24b depressed to a side of the first surface 24a from the second surface 14b are formed. The second depressed portions 24b are arranged on both respective sides in the circumferential direction (the front-rear direction) of the retention hole 12 with respect to the projecting portion 19. The second depressed portion 24b is a bottomed groove depressed to the first surface 24a side and has a dimension in the central axis C direction larger than the dimension in the circumferential direction of the retention hole 12.

The elastic film 26 is made of an elastic body other than the self-lubrication rubber and is a portion secured by adhesion to the second surface 14b and in contact with the installation surface 4. The thickness L2 from a surface in contact with the installation surface 4 to a surface in contact with the second surface 14b in this elastic film 26 is smaller than the minimum dimension L3 of the rigid body portion 24 from the first surface 24a to the second surface 14b. The elastic film 26 is provided with outer elastic films 26a interposed in the front-rear direction between the side surfaces of the rigid body portion 24 and the fixture 5 and fitting portions 26b that fits in the second depressed portions 24b such that they project upward. These outer elastic films 26a and fitting portions 26b are also adhered on the rigid body portion 24.

According to the stabilizer bush 21 as described above, similarly to the first embodiment, the spring constant and the durability of the stabilizer bush 21 can be ensured with the rigid body portion 24 even when a distance between the installation surface 4 and the stabilizer bar 2 is long. The elastic film 26 between the rigid body portion 24 and the installation surface 4 and the outer elastic films 22b and 26a between the rigid body portion 24 and the linear inner surfaces 5c ensure reducing the abnormal noise caused by, for example, rubbing between the rigid body portion 24 and the installation surface 4 and/or the linear inner surfaces 5c. Furthermore, fitting the fitting portions 26b of the elastic film 26 in the second depressed portions 24b formed on the second surface 14b of the rigid body portion 24 ensures causing the interface between the second surface 14b and the elastic film 26 to be difficult to be displaced and improving durability of the stabilizer bush 21.

The circular inner surface 5b and the circular outer surface 13a in the upper side with respect to the retention hole 12 and the first surface 24a and the securing surface 22a in the lower side with respect to the retention hole 12 are each formed into an arc shape about the central axis C on the cross-section perpendicular to the central axis C. This can cause a contact pressure applied to the outer peripheral surface of the stabilizer bar 2 from the inner peripheral surface of the retention hole 12 to become approximately uniform across the circumferential direction. As a result, it is possible to cause a starting point of a delamination of adhesion between the inner peripheral surface of the retention hole 12 and the stabilizer bar 2 to be difficult to occur, thereby ensuring improved strength of the adhesion.

While the present invention has been described based on the embodiments above, the present invention is not limited by the above-described embodiments in any way and it is easily inferred that various improvements and modifications are allowed within a range not departing from the gist of the present invention. For example, shapes and dimensions of each portion, such as the vehicle body member 3, the fixture 5, the bush main bodies 11 and 22, and the rigid body portions 14 and 24, may be appropriately changed. The depressed portion formed on the second surface 14b may be formed into a circular shape surrounding the projecting portion.

While in the above-described first embodiment, the description has been made for the case where the bush main body 11 and the elastic film 16 are integrally molded using the self-lubrication rubber, the material may be partially changed. For example, only a portion that constitutes the inner peripheral surface of the retention hole 12 is formed of the self-lubrication rubber and the other portion may be formed of the elastic body other than the self-lubrication rubber. However, integrally molding all of the bush main body 11 and the elastic film 16 using the self-lubrication rubber ensures further reducing the manufacturing process for the bush main body 11 and the elastic film 16.

While in the above-described first embodiment, the description has been made for the case where the first depressed portion 15a and the second depressed portion 15b open on the first surface 14a and are formed to pass through the rigid body portion 14, it is not necessarily limited to this. The first depressed portion and the second depressed portion that do not open on the first surface 14a may be provided in the rigid body portion 14 as in the above-described second embodiment. A hole or a groove that do not open on the second surface 14b may be provided on the first surface 14a. A part of the bush main body 11 fits in this hole or groove, and thus, the interface between the first surface 14a and the bush main body 11 can be caused to be difficult to be displaced. The first depressed portion 15a and the second depressed portion 15b in the above-described first embodiment may be provided in the rigid body portion 24 of the above-described second embodiment, or a hole or a groove that do not open on the second surface 14b may be provided on the first surface 24a.

While in the above-described second embodiment, the description has been made for the case where one position in the circumferential direction of the bush main body 22 is divided by the cut portion 23, it is not necessarily limited to this. The cut portion 23 may divide two positions in the circumferential, direction of the bush main body 22 or the cut portion 23 may be omitted. The circumferential direction position of the cut portion 23 may be appropriately changed. The cut portion 23 may be provided in the bush main body 11 of the above-described first embodiment.

REFERENCE SIGNS LIST 2 stabilizer bar
3 vehicle body member
4 installation surface
4a mounting hole
5 fixture
5b circular inner surface
5c linear inner surface
10,21 stabilizer bush
11,22 bush main body
12 retention hole
13a circular outer surface
13b linear outer surface
14,24 rigid body portion
14a,24a first surface
14b second surface
15a first depressed portion
15b,24b second depressed portion
16,26 elastic film
19 projecting portion
C central axis

The invention claimed is:

1. A stabilizer bush interposed between an installation surface of a vehicle body member and an inner surface of an arch-shaped fixture mounted on the vehicle body member, the stabilizer bush comprising:
   a bush main body formed of a tubular elastic body having a retention hole through which a stabilizer bar passes, the bush main body having a part of an outer peripheral surface in contact with the inner surface of the fixture;
   a rigid body portion secured to a side of the installation surface of the bush main body, the rigid body portion having a rigidity higher than a rigidity of the bush main body; and
   an elastic film made of the elastic body interposed between the rigid body portion and the installation surface,
   wherein the rigid body portion includes a first surface with which the bush main body is in contact and a second surface arranged between the first surface and the installation surface, the second surface being in contact with the elastic film,
   a thickness from a surface in contact with the installation surface to a surface in contact with the second surface in the elastic film is thinner than a minimum dimension from the first surface to the second surface, and
   on the rigid body portion, a depressed portion is formed to be depressed from the second surface to a side of the first surface such that a part of the elastic film fits in the depressed portion,
   wherein the rigid body portion on both sides of the depressed portion are integrated.

2. The stabilizer bush according to claim 1,
wherein the bush main body and the elastic film are integrally molded using a self-lubrication rubber that covers the rigid body portion.

3. The stabilizer bush according to claim 1,
wherein the depressed portion opens to the first surface and is formed to pass through the rigid body portion, and
the bush main body and the elastic film are integrally molded through the depressed portion.

4. The stabilizer bush according to claim 1,
wherein the first surface is formed into a planar shape perpendicular to a virtual plane including a central axis of the retention hole.

5. The stabilizer bush according to claim 4,
wherein the rigid body portion is an approximately rectangular parallelepiped.

6. The stabilizer bush according to claim 1,
wherein the depressed portion is a bottomed groove.

7. A stabilizer bush interposed between an installation surface of a vehicle body member and an inner surface of an arch-shaped fixture mounted on the vehicle body member, the stabilizer bush comprising:
   a bush main body formed of a tubular elastic body having a retention hole through which a stabilizer bar passes, the bush main body having a part of an outer peripheral surface in contact with the inner surface of the fixture;
   a rigid body portion secured to a side of the installation surface of the bush main body, the rigid body portion having a rigidity higher than a rigidity of the bush main body; and
   an elastic film made of the elastic body interposed between the rigid body portion and the installation surface,
   wherein the rigid body portion includes a first surface with which the bush main body is in contact and a second surface arranged between the first surface and the installation surface, the second surface being in contact with the elastic film,
   a thickness from a surface in contact with the installation surface to a surface in contact with the second surface in the elastic film is thinner than a minimum dimension from the first surface to the second surface,
   on the rigid body portion, a depressed portion is formed to be depressed from the second surface to a side of the first surface such that a part of the elastic film fits in the depressed portion, and
   a projecting portion that projects from the elastic film to an opposite side of the rigid body portion to be inserted into a mounting hole formed on the installation surface,
   wherein the depressed portion includes first depressed portions provided on both sides in a central axis direction of the retention hole with respect to the projecting portion.

8. A stabilizer bush interposed between an installation surface of a vehicle body member and an inner surface of an arch-shaped fixture mounted on the vehicle body member, the stabilizer bush comprising:
   a bush main body formed of a tubular elastic body having a retention hole through which a stabilizer bar passes, the bush main body having a part of an outer peripheral surface in contact with the inner surface of the fixture;
   a rigid body portion secured to a side of the installation surface of the bush main body, the rigid body portion having a rigidity higher than a rigidity of the bush main body; and
   an elastic film made of the elastic body interposed between the rigid body portion and the installation surface,
   wherein the rigid body portion includes a first surface with which the bush main body is in contact and a second surface arranged between the first surface and the installation surface, the second surface being in contact with the elastic film,
   a thickness from a surface in contact with the installation surface to a surface in contact with the second surface in the elastic film is thinner than a minimum dimension from the first surface to the second surface,
   on the rigid body portion, a depressed portion is formed to be depressed from the second surface to a side of the first surface such that a part of the elastic film fits in the depressed portion,
   a projecting portion that projects from the elastic film to an opposite side of the rigid body portion to be inserted into a mounting hole formed on the installation surface, and
   wherein the depressed portion includes second depressed portions provided on both sides in a circumferential direction of the retention hole with respect to the projecting portion.

* * * * *